US011512454B2

(12) United States Patent
Atkinson et al.

(10) Patent No.: US 11,512,454 B2
(45) Date of Patent: Nov. 29, 2022

(54) ENGAGEMENT CONTROL SYSTEM AND METHOD

(71) Applicant: Caterpillar Inc., Deerfield, IL (US)

(72) Inventors: David C. Atkinson, Dunlap, IL (US);
Jeremy Peterson, Washington, IL (US);
Naveen Kumar S. Aproop, Troy, MI (US); Jeremy R. Couch, Sanford, NC (US)

(73) Assignee: Caterpillar Inc., Peoria, IL (US)

( * ) Notice: Subject to any disclaimer, the term of this patent is extended or adjusted under 35 U.S.C. 154(b) by 411 days.

(21) Appl. No.: 16/028,096

(22) Filed: Jul. 5, 2018

(65) Prior Publication Data
US 2020/0011034 A1  Jan. 9, 2020

(51) Int. Cl.
*E02F 9/26* (2006.01)
*E02F 3/65* (2006.01)
(Continued)

(52) U.S. Cl.
CPC ............ *E02F 9/265* (2013.01); *E02F 3/6436* (2013.01); *E02F 3/651* (2013.01); *E02F 9/2029* (2013.01);
(Continued)

(58) Field of Classification Search
CPC ......... E02F 9/003; E02F 9/2025; E02F 9/205; E02F 9/2054; E02F 9/2062; B60W 2300/17
See application file for complete search history.

(56) References Cited

U.S. PATENT DOCUMENTS

| 5,959,572 A * | 9/1999 | Higashimata .......... G08G 1/166 342/70 |
| 6,169,954 B1 * | 1/2001 | McCrary ................... E01D 2/00 701/117 |

(Continued)

FOREIGN PATENT DOCUMENTS

| CA | 2996546 A1 * | 3/2017 | ...... H04W 12/04031 |
| DE | 102018209014 A1 * | 12/2019 | .......... B60W 60/001 |
| WO | WO-2019124225 A1 * | 6/2019 | ............... G05D 1/02 |

OTHER PUBLICATIONS

SoCalEarthMovers, TEREX TS-24B scrapers push-pulling, Mar. 10, 2013, Youtube (Year: 2013).*
(Continued)

*Primary Examiner* — Christian Chace
*Assistant Examiner* — Scott R Jagolinzer
(74) *Attorney, Agent, or Firm* — Leydig, Voit & Mayer, Ltd.

(57) ABSTRACT

A system for controlling an engagement operation between first and second movable machines includes a separation sensor, a relative speed sensor and a controller. The separation sensor determines a separation distance between the first and second machines. The relative speed sensor determines a relative difference in speed between the first and second machines. The controller determines the separation distance between the first and second machines, decelerates the first movable machine when the separation distance is within a deceleration zone, determines a relative difference in speed between the first and second machines, and generates an engagement speed command to operate the first movable machine at a first ground speed equal to a second ground speed of the second movable machine plus a relative engagement speed when the separation distance is within a buffer zone.

19 Claims, 6 Drawing Sheets

(51) Int. Cl.
*E02F 9/20* (2006.01)
*E02F 3/64* (2006.01)

(52) U.S. Cl.
CPC ....... *E02F 9/2054* (2013.01); *B60W 2300/17* (2013.01); *B60W 2510/20* (2013.01); *B60W 2510/30* (2013.01)

(56) References Cited

U.S. PATENT DOCUMENTS

| | | | | |
|---|---|---|---|---|
| 6,370,470 | B1* | 4/2002 | Yamamura | B60K 31/0008 |
| | | | | 180/170 |
| 6,389,351 | B1* | 5/2002 | Egawa | B60K 31/0008 |
| | | | | 340/903 |
| 6,401,024 | B1* | 6/2002 | Tange | B60K 31/0008 |
| | | | | 180/170 |
| 8,170,756 | B2* | 5/2012 | Morey | E02F 3/6436 |
| | | | | 172/786 |
| 9,510,137 | B2 | 11/2016 | McCoy et al. | |
| 9,527,394 | B1* | 12/2016 | Tang | B60W 10/26 |
| 9,915,952 | B2* | 3/2018 | Dollinger | A01B 69/008 |
| 11,383,713 | B2* | 7/2022 | Fukuda | B60W 40/04 |
| 2001/0004028 | A1* | 6/2001 | Sato | B60T 7/12 |
| | | | | 180/169 |
| 2012/0116665 | A1* | 5/2012 | Aoki | B60T 8/17558 |
| | | | | 701/301 |
| 2013/0041576 | A1* | 2/2013 | Switkes | G08G 1/22 |
| | | | | 701/123 |
| 2014/0297135 | A1* | 10/2014 | Larsson | B60W 30/09 |
| | | | | 701/50 |
| 2016/0082954 | A1* | 3/2016 | Rennemann | B60W 30/08 |
| | | | | 701/50 |
| 2016/0138246 | A1* | 5/2016 | Ge | E02F 3/651 |
| | | | | 60/469 |
| 2017/0113608 | A1* | 4/2017 | Patel | G06K 9/00805 |
| 2017/0227972 | A1* | 8/2017 | Sabau | G08G 1/22 |
| 2017/0344023 | A1* | 11/2017 | Laubinger | B60W 50/14 |
| 2018/0050697 | A1* | 2/2018 | Kuszmaul | G08G 1/22 |
| 2020/0189631 | A1* | 6/2020 | Gorman | B61G 7/14 |

OTHER PUBLICATIONS

SoCalEarthMovers, Pair of brand new Caterpillar 657G scrapers, Mar. 25, 2018, Youtube, https://www.youtube.com/watch?v=jf8B6Jb6ppc (Year: 2018).*

SoCalEarthMovers, Pair of D10N's push loading 660B scrapers, Apr. 1, 2012, Youtube, https://www.youtube.com/watch?v=UYZYPIWBI84 (Year: 2012).*

* cited by examiner

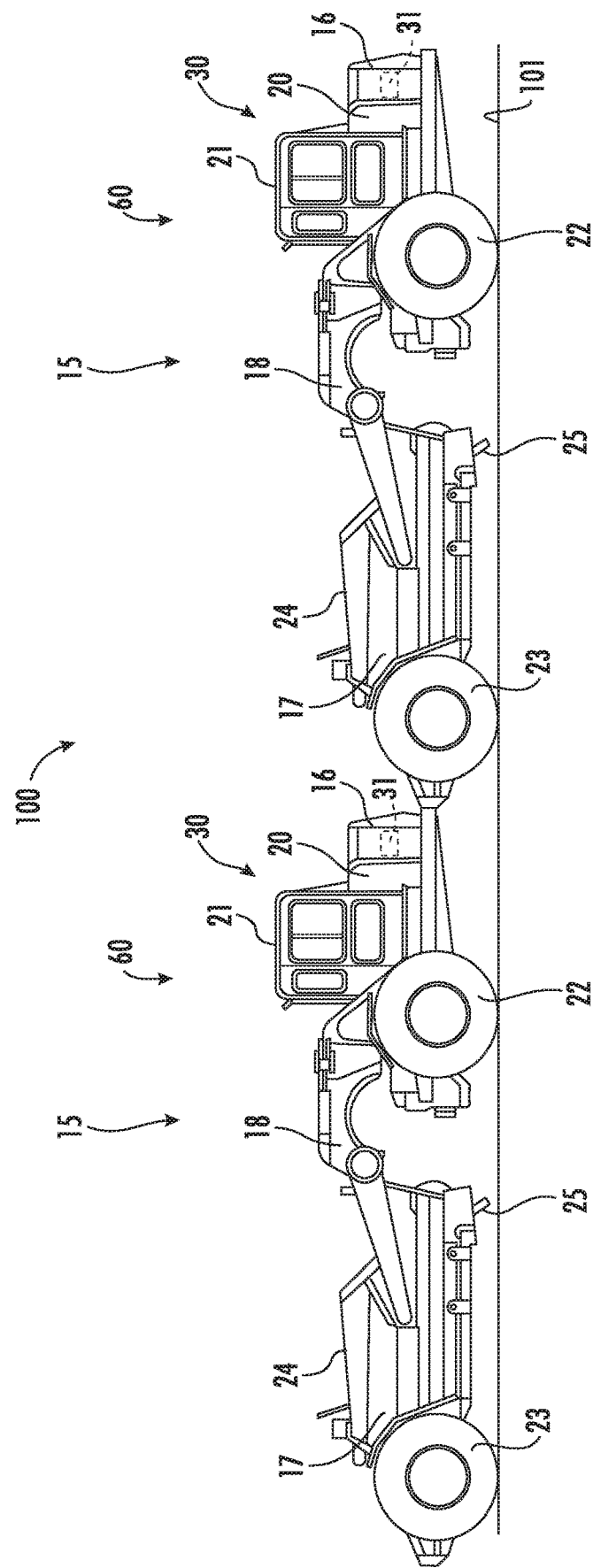

ENGAGEMENT CONTROL SYSTEM AND METHOD

TECHNICAL FIELD

This disclosure relates generally to a system for controlling the engagement or impact between two machines and, more particularly, to a system and method of controlling at least one of the machines to control the engagement or impact between two machines prior to cooperative operation of the two machines.

BACKGROUND

Machines such as wheel tractor scrapers are used to perform material moving operations in which a work implement such as a blade engages the work surface to load material into a body or vessel on or associated with the machine such as a bowl. In some instances, the machine may not have enough power or traction to engage the work surface and load the machine in an efficient manner.

Accordingly, in some instances, a second machine may be used to push the wheel tractor scraper to assist in the loading portion of the material moving operation. To do so, the wheel tractor scraper may typically begin a material loading process and another machine, such as a dozer, may engage and push the rear of the wheel tractor scraper to provide additional power during the loading operation. However, it is desirable to coordinate the engagement of the two machines to optimize the efficiency of the machines operating at the work site and also avoid sudden and significant impacts between the two machines.

U.S. Pat. No. 9,510,137 discloses a wireless communications system operative to assist in the control of a wheel tractor scraper and/or a dozer during a material loading operation. The wheel tractor scraper is depicted as being assisted by either a dozer or another wheel tractor scraper during the material loading operation.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for controlling an engagement operation between a first movable machine and a second movable machine includes a separation sensor, a relative speed sensor and a controller. The separation sensor is operatively associated with the first movable machine and the second movable machine and is configured to determine a separation distance between the first movable machine and the second movable machine. The relative speed sensor is operatively associated with the first movable machine and the second movable machine and is configured to determine a relative difference in speed between the first movable machine and the second movable machine. The controller is configured to access a deceleration zone, access a deceleration rate, access a buffer zone, and access a relative engagement speed. The controller is further configured to determine the separation distance between the first movable machine and the second movable machine based upon the separation sensor, generate a deceleration command to decelerate the first movable machine at the deceleration rate when the separation distance is within the deceleration zone, determine a relative difference in speed between the first movable machine and the second movable machine based upon the relative speed sensor, and generate an engagement speed command to operate the first movable machine at a first ground speed equal to a second ground speed of the second movable machine plus the relative engagement speed when the separation distance is within the buffer zone.

In another aspect, a method of controlling an engagement operation between a first movable machine and a second movable machine includes accessing a deceleration zone, a deceleration rate, a buffer zone, and a relative engagement speed, determining a separation distance between the first movable machine and the second movable machine based upon a separation sensor operatively associated with the first movable machine and the second movable machine, and generating a deceleration command to decelerate the first movable machine at the deceleration rate when the separation distance is within the deceleration zone. The method further includes determining a relative difference in speed between the first movable machine and the second movable machine based upon the relative speed sensor and generating an engagement speed command to operate the first movable machine at a first ground speed equal to a second ground speed of the second movable machine plus the relative engagement speed when the separation distance is within the buffer zone.

In still another aspect, a movable machine includes a ground engaging drive mechanism, a separation sensor, a relative speed sensor, and a controller. The ground engaging drive mechanism is configured to propel the movable machine about a work site. The separation sensor is configured to determine a separation distance between the movable machine and a second movable machine. The relative speed sensor is configured to determine a relative difference in speed between the movable machine and the second movable machine. The controller is configured to access a deceleration zone, access a deceleration rate, access a buffer zone, and access a relative engagement speed. The controller is further configured to determine the separation distance between the movable machine and the second movable machine based upon the separation sensor, generate a deceleration command to decelerate the machine at the deceleration rate when the separation distance is within the deceleration zone, determine a relative difference in speed between the first movable machine and the second movable machine based upon the relative speed sensor, and generate an engagement speed command to operate the machine at a ground speed equal to a second ground speed of the second machine plus the relative engagement speed when the separation distance is within the buffer zone.

BRIEF DESCRIPTION OF THE DRAWINGS

FIG. 6 depicts a diagrammatic illustration of a pair of wheel tractor scrapers.

DETAILED DESCRIPTION

Figure 1:
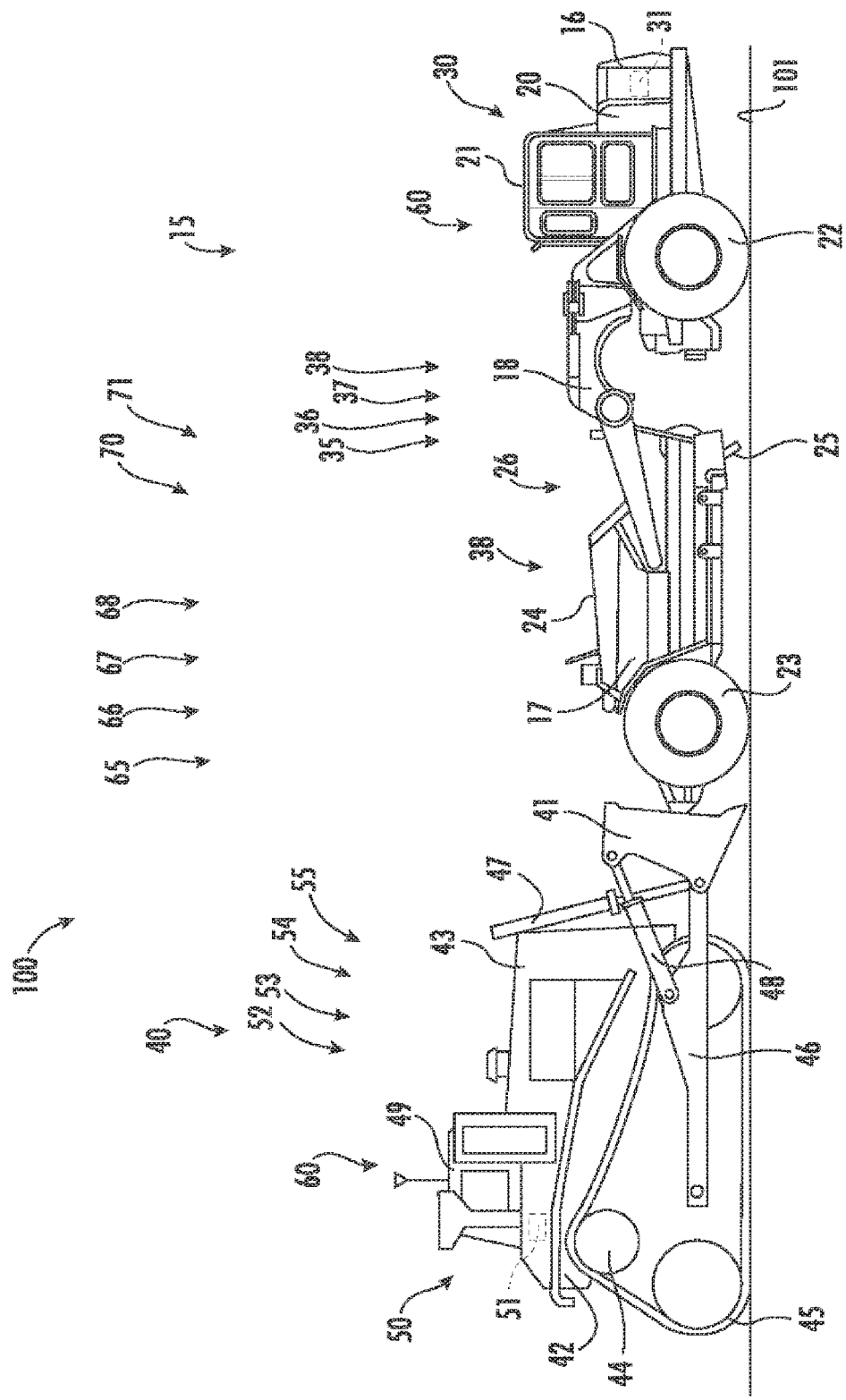
FIG. 1 depicts a diagrammatic illustration of a dozer and a wheel tractor scraper incorporating the principles disclosed herein.

FIG. 1 illustrates an exemplary work site 100 at which a plurality of mobile machines 10 may operate in an autonomous, a semi-autonomous, or a manual manner. Work site 100 may include, for example, a mine site, a landfill, a quarry, a construction site, a road work site, or any other type of work site. The machines 10 may perform desired material moving operations or tasks at the work site 100 such as leveling, clearing, digging, or hauling operations that may require a pair of machines to physically engage and move together.

As used herein, a machine 10 operating in an autonomous manner operates automatically based upon information received from various sensors without the need for human operator input. As an example, a load or haul truck that automatically follows a path from one location to another and dumps a load at an end point may be operating autonomously. A machine operating semi-autonomously includes an operator, either within the machine or remotely, who performs some tasks or provides some input, and other tasks are performed automatically and may be based upon information received from various sensors. As an example, a haul truck that automatically follows a path from one location to another but relies upon an operator command to dump a load may be operating semi-autonomously. In another example of a semi-autonomous operation, an operator may dump a bucket of an excavator in a haul truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

A first of the machines 10 is configured as a wheel tractor scraper 15. The wheel tractor scraper 15 includes a tractor portion 16 and a scraper portion 17 that are pivotally coupled through an articulation hitch 18. The tractor portion 16 may include a prime mover such as an engine 20 and a cab 21 in which an operator may be positioned. The engine 20 is operatively connected to and drives a ground engaging drive mechanism such as the front wheels 22. In some instances, an additional prime mover (not shown) may be provided on the scraper portion 17 to drive the rear wheels 23. The wheel tractor scraper 15 may be used with any machine propulsion and drivetrain mechanisms applicable in the art for causing movement of the machine including those powered by an engine, a fuel cell or batteries as well as hydrostatic, electric, or mechanical drives.

The scraper portion 17 may include a bowl 24 and a ground engaging work implement such as a blade 25 configured to engage the work surface 101 and direct material from the work surface into the bowl. Hydraulic cylinders generally depicted at 26 may be operated to control the depth or height and angle of the blade 25 relative to the work surface 101. The rate by which material may be directed into the bowl 24 from the work surface 101 may be a function of the rate of speed of the wheel tractor scraper 15 together with the depth and angle of the blade 25 relative to the work surface.

Wheel tractor scraper 15 may be controlled by a scraper control system 30 as shown generally by an arrow in FIG. 1 indicating association with the machine. The scraper control system 3 may include an electronic control module or scraper controller 31 and a plurality of sensors. The scraper controller 31 may receive input signals from an operator operating the wheel tractor scraper 15 from within the cab 21 or off-board the machine through a wireless communications system 60. The scraper controller 31 may control the operation of various aspects of the wheel tractor scraper 15 including the drivetrain and the hydraulic systems.

The scraper controller 31 may be an electronic controller that operates in a logical fashion to perform operations, execute control algorithms, store and retrieve data and other desired operations. The scraper controller 31 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the scraper controller 31 such as power supply circuitry, signal conditioning circuitry, driver circuitry, and other types of circuitry.

The scraper controller 31 may be a single controller or may include more than one controller disposed to control various functions and/or features of the wheel tractor scraper 15. The term "controller" is meant to be used in its broadest sense to include one or more controllers and/or microprocessors that may be associated with the wheel tractor scraper 15 and that may cooperate in controlling various functions and operations of the machine. The functionality of the scraper controller 31 may be implemented in hardware and/or software without regard to the functionality. The scraper controller 31 may rely on one or more data maps relating to the operating conditions and the operating environment of the wheel tractor scraper 15 and the work site 100 that may be stored in the memory of or associated with the controller. Each of these data maps may include a collection of data in the form of tables, graphs, and/or equations.

The scraper control system 30 and the scraper controller 31 may be located on the wheel tractor scraper 15 as an on-board control system with an on-board controller or may be distributed with components located remotely from the machine. The functionality of scraper control system 30 may be distributed so that certain functions are performed at the wheel tractor scraper 15 and other functions are performed remotely. In such case, the scraper control system 30 may include a communications system such as a wireless communications system 60 described in further detail below for wireless communication (e.g., transmitting and receiving signals) between the wheel tractor scraper 15 and a system located remote from the machine.

Wheel tractor scraper 15 may be configured to be operated autonomously, semi-autonomously, or manually. When operating semi-autonomously or manually, the wheel tractor scraper 15 may be operated by remote control and/or by an operator physically located within the cab 21.

Wheel tractor scraper 15 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the wheel tractor scraper 15 and that may cooperate to sense various functions, operations, and operating characteristics of the machine and/or aspects of the environment in which the machine is operating.

A position sensor 35, as shown generally by an arrow in FIG. 1, is operative to sense the position and orientation (i.e., the heading, pitch, roll or tilt, and yaw) of the machine relative to the work site 100. The position sensor 35 may include a plurality of individual sensors that cooperate to generate and provide position signals to the scraper controller 31 indicative of the position and orientation of the wheel tractor scraper 15. In one example, the position sensor 35 may include one or more sensors that interact with a positioning system such as a global navigation satellite system or a global positioning system. In other examples, the position sensor 35 may include a perception based system, or may use other systems such as lasers, sonar, or radar to determine all or some aspects of the position of wheel tractor scraper 15.

A ground speed sensor 36, as shown generally, may be used to determine a ground speed of wheel tractor scraper 15. The ground speed sensor 36 may include a dedicated ground speed sensor that generates and provides ground speed signals to the scraper controller 31 indicative of the ground speed of the wheel tractor scraper 15. The ground speed sensor 36 may operate in other manners such as by using data from the position sensor 35 to determine the ground speed of the wheel tractor scraper 15.

Other sensors necessary or desirable for operating the wheel tractor scraper 15 may be provided. For example, a wheel slip sensor indicated generally at 37 may be provided to determine the amount of slip of either or both of the front and rear wheels 22, 23 relative to the work surface 101. In one embodiment, the wheel slip sensor 37 may be defined by other sensors such as an engine speed sensor and/or a torque converter speed sensor operating in conjunction with the ground speed sensor 36. A bowl fill level sensor indicated generally at 38 may be provided to monitor the amount of material within the bowl 24.

A second of the machines 10 is configured as a dozer 40. The dozer 40 includes a ground engaging work implement such as a blade 41, a frame 42, and a prime mover such as an engine 43. A ground-engaging drive mechanism such as a track 45 may be driven by a drive sprocket 44 on opposite sides of the dozer 40 to propel the machine. The engine 43 and a transmission (not shown) are operatively connected to the drive sprockets 44. The dozer 40 may be used with any machine propulsion and drivetrain mechanisms applicable in the art for causing movement of the machine including those powered by an engine, a fuel cell or batteries as well as hydrostatic, electric, or mechanical drives.

The blade 41 may be pivotably connected to the frame 42 by arms 46 on each side of the dozer 40. First hydraulic cylinder 47 coupled to the frame 42 supports movement of the blade 41 in the vertical direction and allows the blade to move up or down vertically from the point of view of FIG. 1. Second hydraulic cylinders 48 on each side of the dozer 40 allow the pitch angle of the blade tip to change relative to a centerline of the machine.

The dozer 40 may include a cab 49 that an operator may physically occupy and provide input to control the machine. The cab 49 may include one or more input devices (not shown) through which the operator may issue commands to control the propulsion system and steering system of the dozer 40 as well as operate various implements associated with the machine.

The dozer 40 may include a dozer control system 50 and a dozer controller 51 generally similar or identical to the scraper control system 30 and scraper controller 31 of the wheel tractor scraper 15. In addition, the dozer control system 50 of the dozer 40 may include a wireless communications system 60 generally similar or identical to the wireless communications system 60 of the wheel tractor scraper 15.

Further, the dozer control system 50 may include sensors similar or identical to those of the wheel tractor scraper 15. For example, the dozer 40 may include a position sensor 52 and a ground speed sensor 53 similar or identical to those of the wheel tractor scraper 15. In addition, rather than include a wheel slip sensor, the dozer 40 may include track slip sensor 54 to determine the amount of slip of the tracks 45 relative to the work surface 101. In one embodiment, the track slip sensor 54 may be defined by other sensors such as a track speed sensor, indicated generally at 55, configured to determine the actual speed of the tracks 45 operating in conjunction with the ground speed sensor 53.

Figure 2:
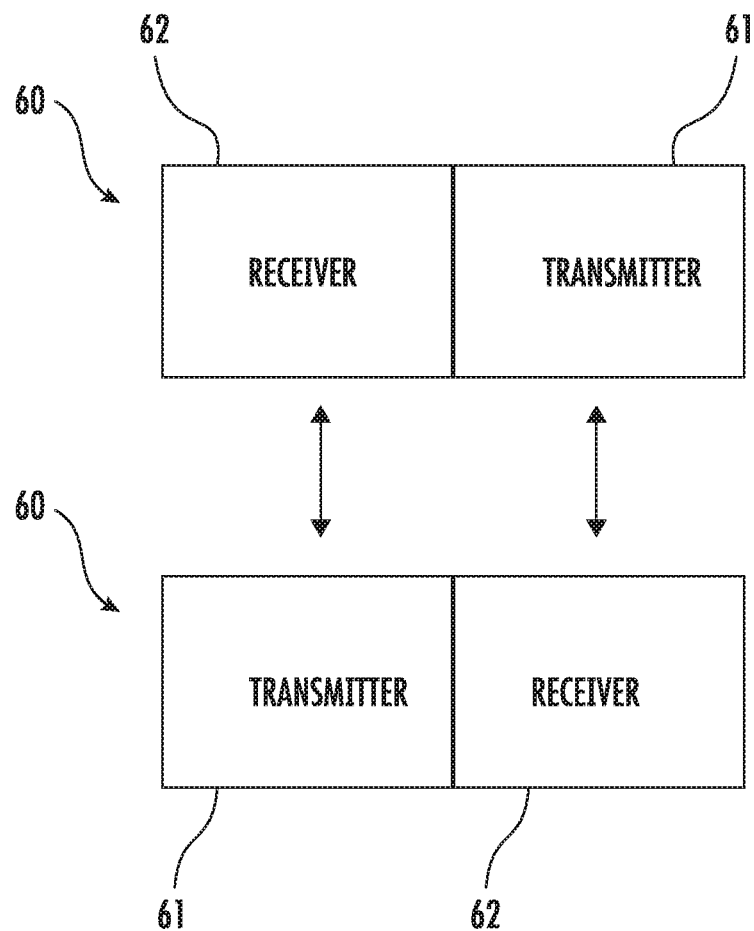
FIG. 2 depicts a schematic illustration of a wireless communications system.

As discussed above, each of the wheel tractor scraper 15 and the dozer 40 may include a wireless communications system 60 for wireless communications between the machine and a remote system. In one embodiment depicted in FIG. 2, each wireless communications system 60 may include a transmitter 61 for transmitting signals from one wireless communications system and a receiver 62 for receiving signals from a transmitter system of another wireless communications system. In some instances, the transmitter 61 and the receiver 62 may be combined as a transceiver system. Commands or instructions may be sent directly between the machines 10 and/or may be directed through another systems such as by sending signals through a command center or a network node remote from the machines and then to the desired machine.

The wireless communications system 60 may implement or utilize any desired system or protocol including any of a plurality of communications standards. The desired protocols will permit communication between the machine 10 and the remote system, as well as between any machine and other desired machines or systems. Examples of wireless communications systems or protocols that may be used include a wireless personal area network such as Bluetooth® (e.g., IEEE 802.15) or another personal area network or a local area network such as any of the IEEE 802.11 standards, a cellular network, or any other system or protocol for data transfer.

While operating the wheel tractor scraper 15, the machine is propelled to a desired location at the work site 100 and the ground engaging work implement or blade 25 is lowered to engage the work surface 101. In some instances, the wheel tractor scraper 15 may not have enough power or traction to force the desired amount of material into the bowl 24. For example, the work surface 101 may be too hard in certain areas or the material movement plan may call for a relatively deep cut into the work surface.

In order to effectively operate under conditions in which it may be difficult for a wheel tractor scraper 15 to follow a material movement plan, a second machine may be utilized to push or pull the wheel tractor scraper during all or portions of the loading phase at which the ground engaging work implement or blade 25 engages the work surface 101. For example, the wheel tractor scraper 15 may be pushed by another machine such as the track-type tractor or dozer 40 as depicted in FIG. 1. In another example depicted in FIG. 6, a pair of wheel tractor scrapers 15 may be coupled with each assisting the other during material loading operations of both machines.

Figure 3:
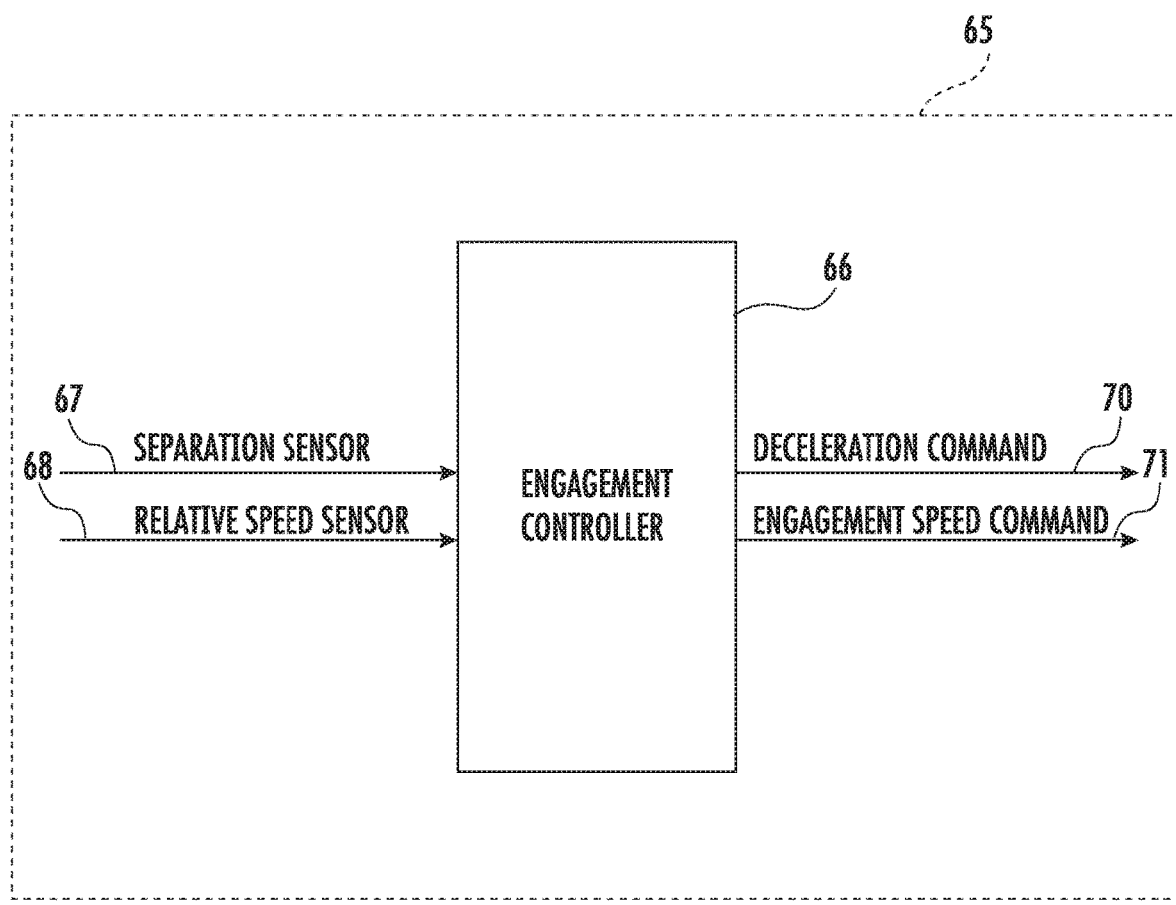
FIG. 3 is a block diagram of an engagement control system in accordance with the disclosure.

In an operation in which a machine such as the dozer 40 is utilized to push the wheel tractor scraper 15, it is desirable to coordinate the positions and speeds of the two machines to maneuver them in a desired and optimized manner prior to engagement or contact between the two machines. Accordingly, an engagement control system, generally indicated by an arrow at 65 in FIG. 1, may be provided to coordinate the movement of the two machines 10 such as the wheel tractor scraper 15 and the dozer 40. The engagement control system 65 may be operative to control the operations of one or both of the machines 10 prior to engagement as well as the subsequent material loading operation together. Referring to FIG. 3, the engagement control system 65 may be implemented by an engagement controller 66 defined by any combination of the scraper controller 31, the dozer controller 51, or any other controller. In other words, operation of the engagement control system 65 may be controlled by the scraper controller 31, the dozer controller 51, and/or any other controller associated with the wheel tractor scraper 15 and/or the dozer 40 and may be referred to herein as the engagement controller 66.

The engagement control system 65 may determine the distance or separation and the relative difference in speed between the wheel tractor scraper 15 and the dozer 40. To do so, a separation sensor 67 and a relative speed sensor 68 may be provided.

In some embodiments, the separation sensor 67 may be defined by the combination of the position sensor 35 of the wheel tractor scraper 15 and the position sensor 52 of the dozer 40 that are operative to determine the positions of the wheel tractor scraper and dozer, respectively, with the engagement controller 66 determining the distance between the two machines based upon their individual positions. In other embodiments, a dedicated separation sensor may be provided on one of the wheel tractor scraper 15 or dozer 40 to determine the separation distance between the two machines. For example, the dedicated separation sensor may be configured as a camera system, radar, or LIDAR that directly measures the distance between the two machines without determining the positions of either machine.

In some embodiments, the relative speed sensor 68 may be defined by the combination of the ground speed sensor 36 of the wheel tractor scraper 15 and the ground speed sensor 53 of the dozer 40, which are operative to determine the speeds of the wheel tractor scraper and dozer, respectively, together with the engagement controller 66 that determines the relative difference in speed based upon the speeds of the individual machines. In other embodiments, a dedicated relative speed sensor may be provided on one of the wheel tractor scraper 15 or the dozer 40 to determine the relative difference in speed. In one embodiment, the relative speed sensor may be configured as a camera system, radar, or LIDAR that directly measures the relative difference in speed without necessarily determining the actual speed of either machine.

INDUSTRIAL APPLICABILITY

The industrial applicability of the engagement control system 65 described herein will be readily appreciated from the forgoing discussion. The foregoing discussion is applicable to machines 10 that are operated at a work site 100 with pairs of machines physically engaging or contacting each other to assist in moving one of the machines for a desired period of time. Such engagement control system 65 may be used at a mining site, a landfill, a quarry, a construction site, a roadwork site, a forest, a farm, or any other area in which coordinated movement between machines is desired.

Figure 4:
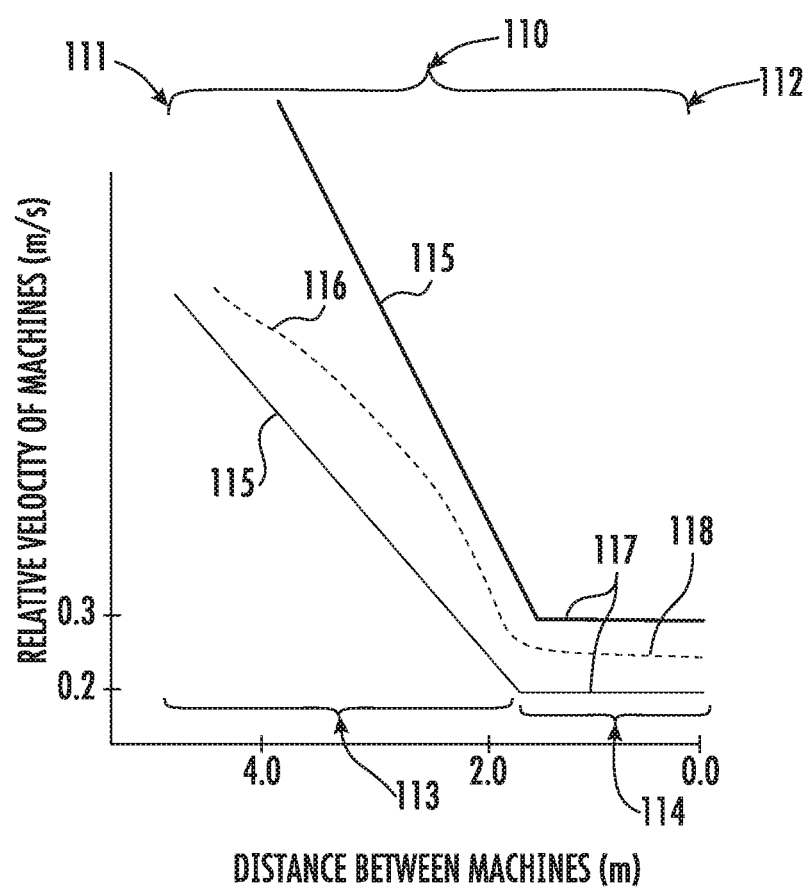
FIG. 4 depicts an exemplary graph of the relative velocity of the machines as a function of the separation distance between the machines.

In operation, a wheel tractor scraper 15 may begin a material loading operation in which assistance in propelling the machine is desirable. In such case, a second machine such as a dozer 40 is aligned with and approaches the wheel tractor scraper 15 from behind. It is often desirable for the second machine such as the dozer 40 to approach and engage the wheel tractor scraper 15 as rapidly as possible without causing a significant impact upon engagement. Referring to FIG. 4, an exemplary graph of the relative velocity of the machines as a function of the separation distance between the machines is depicted. As the dozer 40 approaches the wheel tractor scraper 15, the distance between the machines (i.e., the separation distance) may be relatively large. However, once the dozer 40 is within a desired distance of the wheel tractor scraper 15, depicted in FIG. 4 as an operational zone 110, the engagement controller 66 may begin to control the operation of the dozer 40 or provide instructions to an operator of the dozer to assist in its operation.

The operational zone 110 defines a distance or an amount of separation between the wheel tractor scraper 15 and the dozer 40 at which the engagement control system 65 begins to operate. In other words, the engagement control system 65 begins to operate when the dozer 40 approaches (and is aligned with) the wheel tractor scraper 15 and the separation distance between the two machines is less than the length of the operational zone 110.

The operational zone 110 has a first end 111 at which the engagement control system 65 begins to operate and a second end 112 at which the wheel tractor scraper 15 and the dozer 40 are physically engaged or contact each other. The length of the operational zone 110 may be divided into two smaller zones or distances. A first or deceleration zone 113 extends from the first end 111 of the operational zone 110 and towards the second end 112. A second or buffer zone 114 extends from the deceleration zone 113 to the second end 112 of the operational zone 110.

In one embodiment, the distance or length of the deceleration zone 113 may be 2-5 m. In other embodiments, the distance or length of the deceleration zone 113 may be 3-4 m. Still other distances or lengths of the deceleration zone 113 are contemplated. In one embodiment, the distance or length of the buffer zone 114 may be 1-2 m. In another embodiment, the distance or length of the buffer zone 114 may be approximately 1.5 m. Still other distances or lengths of the buffer zone 114 are contemplated.

During the time that the separation distance between the wheel tractor scraper 15 and the dozer 40 is within the deceleration zone 110, the engagement controller 66 may call for or generate deceleration signals resulting in a reduction in speed or deceleration of the dozer. Such deceleration may be according to or based upon an deceleration rate stored within the engagement controller 66. The deceleration rate defines a desired deceleration of the dozer 40 while operating within the deceleration zone 110.

In one embodiment, the deceleration rate may be within a range of between 1-5 m/s$^2$. In another embodiment, the deceleration rate may be within a range of 2-4 m/s$^2$. Still other ranges are contemplated. The outer limits of an exemplary deceleration range are depicted by lines 115 in FIG. 4. An exemplary deceleration of the dozer 40 is depicted by line 116.

In some instances, the deceleration rate may be fixed while the separation distance of the wheel tractor scraper 15 and the dozer 40 is within the deceleration zone 110. In other instances, the deceleration rate may decline as the dozer 40 approaches the wheel tractor scraper 15. Still further, the deceleration rate may be greater if the deceleration zone is smaller in order to sufficiently slow the dozer before reaching the buffer zone 114. In any case, as depicted in FIG. 4, the relative difference in speed between the two machines decreases as the distance between the machines decreases.

The deceleration of the dozer 40 may be terminated once the separation distance between the machines falls within the buffer zone 114 (i.e., the dozer is relatively close to the wheel tractor scraper 15). The buffer zone 114 corresponds to or defines a distance or amount of separation between the wheel tractor scraper 15 and the dozer 40 at which the engagement controller 66 may further control the operation of the dozer or provide instructions to an operator of the dozer to control the engagement between the machines.

While the wheel tractor scraper 15 and the dozer 40 are operating within the buffer zone 113, the engagement controller 66 may call for or generate propulsion signals resulting in the dozer operating at a slightly greater speed than that of the wheel tractor scraper 15. The difference in speeds between the wheel tractor scraper 15 and the dozer 40 may be stored within the engagement controller 66 as a relative engagement speed and defines a desired difference in relative speed between the two machines.

In one embodiment, the relative engagement speed may be 0.2-0.3 m/s. In another embodiment, the relative engagement speed may be 0.225-0.275 m/s. In still another embodiment, the relative engagement speed may be approximately 0.25 m/s. The outer limits of an exemplary relative engagement speed are depicted by lines 117 in FIG. 4. An exemplary relative engagement speed is depicted by line 118.

By operating at the relative engagement speed while the separation distance between the wheel tractor scraper 15 and the dozer 40 is within the buffer zone 114, the dozer may overtake the wheel tractor scraper relatively quickly (because of the short length of the buffer zone) but the engagement or impact between the wheel tractor scraper 15 and the dozer 40 will be relatively minor or small.

Figure 5:
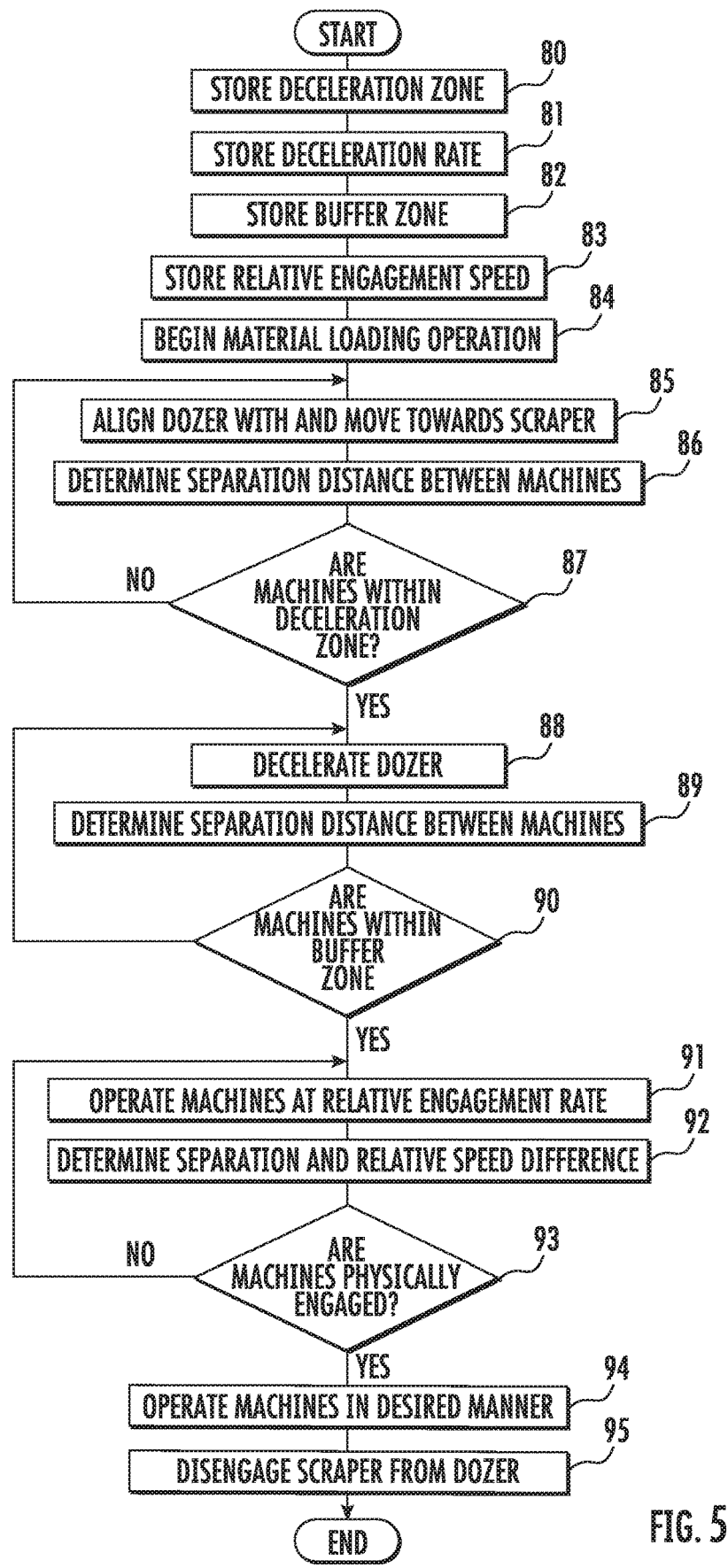
FIG. 5 depicts a flowchart illustrating a scraping operation with the assistance of a dozer.

FIG. 5 depicts a flowchart of an exemplary operation of a dozer 40 approaching and subsequently engaging and pushing a wheel tractor scraper 15 as depicted in FIG. 1. At stage 80, the deceleration zone 110 may be stored within or accessed by the engagement controller 66. At stage 81, the deceleration rate may be stored within or accessed by the engagement controller 66. The buffer zone 114 may be stored within or accessed by the engagement controller 66 at stage 82. At stage 83, the relative engagement speed or rate may be stored within or accessed by the engagement controller 66.

At stage 84, an unaided material loading operation may be begun. In doing so, in one configuration, the wheel tractor scraper 15 is moved to a desired location and the blade 25 moved to a desired depth and orientation relative to the work surface 101. The wheel tractor scraper 15 is propelled by the front wheels 22 and/or the rear wheels 23 to propel the machine forward and begin the material movement operation resulting in material from the work surface 101 being directed into the bowl 24.

As the wheel tractor scraper 15 begins the material movement operation, a second machine such as the dozer 40 may be aligned with and moved towards the scraper at stage 85. At stage 86, the separation distance between machines may be determined. In one embodiment, to do so, each of the controllers of the machines 10 may receive the position signals from their respective position sensors and determine their respective positions. More specifically, the scraper controller 31 may receive position data from the position sensor 35 and determine the position of the wheel tractor scraper 15. The dozer controller 51 may receive position data from the dozer position sensor 52 and determine the position of the dozer 40.

The relative positions of the wheel tractor scraper 15 and the dozer 40 may be determined in any desired manner. In one embodiment, the position of the wheel tractor scraper 15 may be transmitted by the scraper controller 31 to the dozer controller 51 via the wireless communications system 60 on each machine. The dozer controller 51 may then determine the relative position or the distance between the two machines based upon the positions of the wheel tractor scraper 15 and the dozer 40.

At decision stage 87, the dozer controller 51 may determine whether the separation distance between two machines is within the deceleration zone 113. In other words, the dozer controller 51 may determine whether the separation distance between the two machines is less than the length of the operational zone 110. If the separation distance between the two machines is outside of the deceleration zone 110, the unaided material loading operation of the wheel tractor scraper 15 is continued, the dozer 40 is continued to move towards the scraper, and stages 85-87 repeated. If the separation distance between the two machines is within the deceleration zone 110, the dozer controller 51 may generate at stage 88 a deceleration command 70 (FIG. 3) to decelerate the dozer according to or at the deceleration rate.

At stage 89, the separation distance between machines may be determined. In one embodiment, the separation distance may be determined in the same manner as stage 86 and the description thereof is not repeated.

At decision stage 90, the dozer controller 51 may determine whether the r separation distance between the two machines is within the buffer zone 114. If the dozer 40 is outside of the buffer zone 114, stages 88-89 are repeated and the deceleration of the dozer 40 is continued with the dozer decelerating at the deceleration rate.

If the separation distance between the wheel tractor scraper and the dozer 40 is within the buffer zone 114, the dozer controller 51 may generate at stage 91 an engagement speed command 71 (FIG. 3) to operate the dozer at a rate of speed equal to a rate of speed of the wheel tractor scraper 15 plus the relative speed rate when the separation distance is within the buffer zone according to the relative engagement speed. In doing so, the dozer 40 is instructed to move towards the wheel tractor scraper 15 at a speed that is slightly faster than the speed of the wheel tractor scraper. More specifically, the dozer 40 is controlled to move in the same direction as the wheel tractor scraper 15 and at a speed that exceeds that of the scraper by an amount equal to the relative engagement speed.

In order to generate such an engagement speed command 71, the relative speed difference between the two machines must be known. Accordingly, At stage 92, the separation distance between machines and the difference in speeds or relative speed difference of the machines may be determined. In one embodiment, to do so, each of the controllers of the machines 10 may receive the position and speed signals from their respective sensors and determine their respective positions and speeds. More specifically, the scraper controller 31 may receive position data from the position sensor 35 and determine the position of the wheel tractor scraper 15. The scraper controller 31 may further receive speed data from the ground speed sensor 36 and determine the ground speed of the wheel tractor scraper 15. The dozer controller 51 may receive position data from the position sensor 52 of the dozer 40 and determine the position of the dozer. The dozer controller 51 may further receive speed data from the ground speed sensor 53 and determine the ground speed of the dozer 40.

The relative positions and speeds of the wheel tractor scraper 15 and the dozer 40 may be determined in any desired manner. In one embodiment, the position and speed of the wheel tractor scraper 15 may be transmitted by the scraper controller 31 to the dozer controller 51 through the wireless communications system 60 on each machine. The dozer controller 51 may then determine the relative position or the distance between the two machines based upon the positions of the wheel tractor scraper 15 and the dozer 40. Similarly, the dozer controller 51 may determine the relative speed or difference in speeds between the two machines based upon the speeds of the wheel tractor scraper 15 and the dozer 40.

At decision stage 93, the dozer controller 51 may determine whether the two machines have made contact with each other. If the dozer 40 has not yet made contact with the wheel tractor scraper 15, stages 91-92 are repeated and movement of the dozer 40 towards the wheel tractor scraper 15 is continued with the difference in speeds between the machines being equal to the relative engagement speed.

If the dozer 40 has made contact with the wheel tractor scraper 15, the speeds of the two machines may be synchronized and the material movement process continued as desired at stage 94. In one example of a material movement process, the scraper controller 31 and the dozer controller 51 may communicate via their wireless communications systems 60 so that both controllers generate propulsion commands that will result in the speeds at which the machines are operating are identical or synchronized. Further, the scraper controller 31 and the dozer controller 51 may communicate in order to optimize the propulsion of the two machines. More specifically, the scraper controller 31 may monitor the wheel slip via the wheel slip sensor 37 and the dozer controller 51 may monitor the track slip via the track slip sensor 58 and each adjust the propulsion of its respective machine so that they are operating with a desired amount of slip. Further, if desired, the depth of the blade 25 of the wheel tractor scraper 15 may be adjusted based upon the wheel slip and/or the track slip.

Still further, scraper controller 31 and the dozer controller 51 may communicate to coordinate when and how the two machines will separate once the bowl 24 has been sufficiently filled with material. More specifically, if the wheel tractor scraper 15 includes a bowl fill level sensor 38 for monitoring the amount of material in the bowl 24, the scraper controller 31 may generate and send a signal to the dozer controller 51 when the bowl is sufficiently full to communicate to the dozer 40 that the pushing operation may be terminated. Through such communication, the dozer 40 may disengage from the wheel tractor scraper 15 at the earliest possible opportunity. Such disengagement may save fuel and also permit the dozer 40 to more quickly push other wheel tractor scrapers 15 to increase the efficiency of the overall operation.

Once the material movement process has been completed, the wheel tractor scraper 15 and the dozer 40 may be disengaged at stage 95.

Various alternative configurations and manners of operation are contemplated. For example, rather than communicating directly between the scraper controller 31 and the dozer controller 51, communication may be routed through a system or node remote from the wheel tractor scraper 15 and the dozer 40. In addition, the information being transmitted from one machine to the other may be displayed to the machine operators to assist the operator in controlling their machine rather than utilizing one of the controllers to directly control the operation of the other machine.

Further, other manners of determining the separation distance and relative speed difference between machines are contemplated. For example, rather than sending the position and speed of the wheel tractor scraper 15 to the dozer 40, the positions and speeds of the two machines may be sent to a controller remote from the dozer to perform the calculation to determine the separation distance and relative speed differences. The remote controller may also perform the analyses as to whether the separation distance between the machines is within the deceleration zone 114 at decision stage 87, within the buffer zone 114 at stage 90, and whether the machines have made contact with each other at decision stage 93. In one embodiment, the controller remote from the dozer 40 may be the scraper controller 31. In another embodiment, the controller remote from the dozer 40 may be a controller remote from both the scraper controller 31 and the dozer controller 51.

In another example, the separation distance and relative speed difference between the wheel tractor scraper 15 and the dozer 40 may be determined by a single sensor disposed on one of the wheel tractor scraper or the dozer. For example, the dozer 40 may include a camera system, radar, LIDAR, or another type of sensor or system that operates as either or both the dedicated separation sensor and the dedicated relative speed sensor so that the dozer may determine the separation distance and relative speed differences and perform the analyses as to whether the separation distance between the machines is within the deceleration zone 114 at decision stage 87, within the buffer zone 114 at stage 90, and whether the machines have made contact with each other at decision stage 93 without receiving information from the wheel tractor scraper 15 or any other system remote from the dozer.

In some instances, rather than the wheel tractor scraper 15 being pushed by the dozer 40, other machines may be used to push the scraper. For example, in some instances, two wheel tractor scrapers 15 may operate together as depicted in FIG. 6. In such case, the operation of the engagement control system 65 may be similar or identical to that depicted in FIGS. 4-5. However, the process of stages 94-95 may differ in that after filling the bowl 24 of one machine, rather than disengaging the machines, the two machines may continue to operate together but with the blade of the first machine raised and the blade of the second machine lowered to engage the work surface 101 to fill the bowl of the second machine. The disengagement process of stage 95 may occur only after the bowls 24 of both machines have been sufficiently filled.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for controlling an engagement operation to result in physical pushing between a first movable machine and a second movable machine, the system comprising:
    a separation sensor operatively associated with the first movable machine and the second movable machine and configured to determine a separation distance between the first movable machine and the second movable machine;
    a relative speed sensor operatively associated with the first movable machine and the second movable machine and configured to determine a relative difference in ground speed between the first movable machine and the second movable machine; and
    a controller configured to:
    access a predetermined deceleration zone between the first movable machine and the second movable machine stored in memory;
    access a predetermined deceleration rate stored in memory;
    access a predetermined buffer zone between the first movable machine and the second movable machine stored in memory;
    access a predetermined relative engagement speed stored in memory;
    determine the separation distance between the first movable machine and the second movable machine based upon separation data from the separation sensor;
    determine if the separation distance is within the deceleration zone and generate a deceleration command to decelerate the first movable machine at the deceleration rate when the separation distance is within the deceleration zone;
    determine a relative difference in speed between the first movable machine and the second movable machine based upon speed data from the relative speed sensor;
    determine if the separation distance is within the buffer zone and generate an engagement speed command to adjust the relative difference in ground speed to operate the first movable machine at a first ground speed equal to a second ground speed of the second movable machine plus the relative engagement speed when the separation distance is within the buffer zone,
    determine if the first movable machine and the second movable machine are in physical contact with each other; and
    generate a propulsion command to operate the first movable machine and the second movable machine at synchronized ground speeds so that the first movable machine physically contacts and pushes the second movable machine.

2. The system of claim 1, wherein the separation sensor comprises a first position sensor associated with the first movable machine and a second position sensor associated with the second movable machine, and the controller is further configured to determine the separation distance based upon a first position of the first movable machine determined based upon the first position sensor and a second position of the second movable machine determined based upon the second position sensor wherein the separation sensor incorporates a global satellite navigation system.

3. The system of claim 1, wherein the separation sensor is operative to determine the separation distance without determining a first position of the first movable machine and a second position of the second movable machine wherein the separation sensor is a perception based sensor selected from the group comprising LIDAR, sonar, radar, or a camera.

4. The system of claim 1, wherein the relative speed sensor comprises a first ground speed sensor associated with the first movable machine and a second ground speed sensor associated with the second movable machine, and the controller is further configured to determine the relative difference in speed based upon the first ground speed of the first movable machine determined based upon the first ground speed sensor and the second ground speed of the second movable machine determined based upon the second ground speed sensor.

5. The system of claim 1, wherein the relative speed sensor is operative to determine the relative difference in speed without determining the first ground speed of the first movable machine and the second ground speed of the second movable machine.

6. The system of claim 1, wherein the controller is disposed on the first movable machine and is configured to determine the separation distance, generate the deceleration command, and generate the engagement speed command without receiving the first ground speed and a first position from the first movable machine.

7. The system of claim 1, wherein the deceleration rate is between 1-5 m/s2 and the relative engagement speed is between 0.2 and 0.3 m/s.

8. The system of claim 7, wherein the deceleration zone is 2-5 m and the buffer zone is 1-2 m.

9. The system of claim 1, wherein the deceleration rate is between 2-4 m/s2 and the relative engagement speed is between 0.225 and 0.275 m/s.

10. The system of claim 1, wherein the second movable machine comprises a ground engaging work implement.

11. The system of claim 1, wherein the first mobile machine and the second mobile machine are in wireless communication to wirelessly exchange the separation distance and ground speed.

12. A method of controlling an engagement operation to result in physical pushing between a first movable machine and a second movable machine, the method comprising:
    accessing a predetermined deceleration zone between the first movable machine and the second movable machine stored in memory;
    accessing a predetermined deceleration rate stored in memory;
    accessing a predetermined buffer zone between the first movable machine and the second movable machine stored in memory;
    accessing a predetermined relative engagement speed stored in memory;
    determining a separation distance between the first movable machine and the second movable machine based upon data from a separation sensor operatively associated with the first movable machine and the second movable machine;

determine if the separation distance is within the deceleration zone and generating a deceleration command to decelerate the first movable machine at the deceleration rate when the separation distance is within the deceleration zone;

determining a relative difference in speed between the first movable machine and the second movable machine based upon data from a relative speed sensor operatively associated with the first movable machine and the second movable machine;

determine if the separation distance is within the buffer zone and generating an engagement speed command to adjust the relative difference in speed to operate the first movable machine at a first ground speed equal to a second ground speed of the second movable machine plus the relative engagement speed when the separation distance is within the buffer zone;

determine if the first movable machine and the second movable machine are in physical contact with each other; and generate a propulsion command to operate the first movable machine and the second movable machine at synchronized ground speeds so that the first movable machine physically contacts and pushes the second movable machine.

13. The method of claim 12, further comprising determining a first position of the first movable machine based upon a first position sensor associated with the first movable machine and determining a second position of the second movable machine based upon a second position sensor associated with the second movable machine and determining the separation distance based upon the first position of the first movable machine and the second position of the second movable machine wherein the separation sensor incorporates a global satellite navigation system.

14. The method of claim 12, including determining the separation distance without determining a first position of the first movable machine and a second position of the second movable machine wherein the separation sensor is a perception based sensor selected from the group comprising LIDAR, sonar, radar, or a camera.

15. The method of claim 12, further comprising determining the first ground speed of the first movable machine based upon a first ground speed sensor associated with the first movable machine and determining the second ground speed of the second movable machine based upon a second ground speed sensor associated with the second movable machine and determining the relative difference in speed based upon the first ground speed of the first movable machine and the second ground speed of the second movable machine.

16. The method of claim 12, including determining the relative difference in speed without determining the first ground speed of the first movable machine and the second ground speed of the second movable machine.

17. The method of claim 12, including determining, by a controller on the first movable machine, the separation distance, generating, by the controller on the first movable machine, the deceleration command, and generating, by the controller on the first movable machine, the engagement speed command without receiving the first ground speed and a first position from the first movable machine.

18. The method of claim 12, wherein the deceleration rate is between 1-5 m/s2 and the relative engagement speed is between 0.2 and 0.3 m/s.

19. A movable machine comprising:

a ground engaging drive mechanism configured to propel the movable machine about a work site;

a separation sensor configured to determine a separation distance between the movable machine and a second movable machine;

a relative speed sensor configured to determine a relative difference in ground speed between the movable machine and the second movable machine; and a controller configured to:

access a predetermined deceleration zone between the movable machine and the second machine that is stored in memory;

access a predetermined deceleration rate stored in memory;

access a predetermined buffer zone between the movable machine and the second movable machine that is stored in memory;

access a predetermined relative engagement speed stored in memory;

determine the separation distance between the movable machine and the second movable machine based upon the separation sensor;

determine if the separation distance is within the deceleration zone and generate a deceleration command to decelerate the machine at the deceleration rate when the separation distance is within the deceleration zone;

determine a relative difference in ground speed between the movable machine and the second movable machine based upon the relative speed sensor;

determine if the separation distance is within the buffer zone and generate an engagement speed command to adjust the relative difference in ground speed to operate the machine at a ground speed equal to a second ground speed of the second movable machine plus the relative engagement speed when the separation distance is within the buffer zone, determine if the movable machine and the second movable machine are in physical contact with each other; and generate a propulsion command to operate the movable machine and the second movable machine at synchronized ground speeds so that the movable machine physically contacts and pushes the second movable machine.

* * * * *